US009752715B2

(12) United States Patent
Heaton (10) Patent No.: US 9,752,715 B2
(45) Date of Patent: Sep. 5, 2017

(54) DECORATIVE AND MAGNETIC CLEANOUT COVER (71) Applicant: Duane Heaton, Huntington Beach, CA (US)

(72) Inventor: Duane Heaton, Huntington Beach, CA (US)

( * ) Notice: Subject to any disclaimer, the term of this patent is extended or adjusted under 35 U.S.C. 154(b) by 79 days.

(21) Appl. No.: 14/943,283

(22) Filed: Nov. 17, 2015

(65) Prior Publication Data
US 2016/0138748 A1 May 19, 2016

Related U.S. Application Data (60) Provisional application No. 62/082,024, filed on Nov. 19, 2014.

(51) Int. Cl.
*A47K 1/14* (2006.01)
*F16L 45/00* (2006.01)

(52) U.S. Cl.
CPC ..................... *F16L 45/00* (2013.01)

(58) Field of Classification Search
CPC ........................................ F16L 45/00
USPC ........................................ 4/295, 293, 286
See application file for complete search history.

(56) References Cited

U.S. PATENT DOCUMENTS

| 2,455,506 | A |   | 12/1946 | Leslie |       |
|-----------|---|---|---------|--------|-------|
| 3,927,428 | A |   | 12/1975 | Guldin et al. | |
| 4,360,041 | A | * | 11/1982 | Hagan  | F16L 45/00 |
|           |   |   |         |        | 137/247.43 |
| 4,701,089 | A |   | 10/1987 | Nettel |       |
| 5,038,829 | A |   | 8/1991  | Panella |      |
| 5,129,770 | A |   | 7/1992  | Coleman |      |
| 5,465,078 | A |   | 11/1995 | Jones  |       |
| 5,603,472 | A | * | 2/1997  | Hutter, III | B64C 1/12 |
|           |   |   |         |        | 244/132 |
| 5,642,973 | A |   | 7/1997  | Pretty |       |
| 6,086,972 | A |   | 7/2000  | Rayburn |      |
| 6,269,493 | B2 |  | 8/2001  | Sorensen |     |
| 8,380,055 | B1 |  | 2/2013  | Bridegum |     |

(Continued)

FOREIGN PATENT DOCUMENTS

| CN | 200992731 | 12/2007 |
| CN | 201305897 | 9/2009 |

OTHER PUBLICATIONS

Rockler, Woodworking and Hardware—Commercial Website http://www.rockler.com/round-magnetic-catch-choose-size.

(Continued)

*Primary Examiner* — Huyen Le
(74) *Attorney, Agent, or Firm* — Hankin Patent Law, APC; Kevin Schraven; Anooj Patel (57) ABSTRACT

A decorative and magnetic cleanout cover. The decorative and magnetic cleanout cover may comprise: a cover portion and a magnet. The magnet may be coupled to the cover portion and may be adapted to magnetically engage with a cleanout engagement device. The cleanout engagement device may be configured to physically engage with a drain cleanout. The cover portion may be configured to substantially obscure from view the drain cleanout when the cover portion is magnetically coupled to the cleanout engagement device. The cleanout cover may be removeable from the cleanout engagement device, such that the drain cleanout is accessible when the cleanout cover is removed.

7 Claims, 12 Drawing Sheets

(56) References Cited

U.S. PATENT DOCUMENTS

2008/0286071 A1* 11/2008 Potter ............... F16B 1/0071
  411/372.6
2010/0024622 A1   2/2010 Kim
2011/0197349 A1   8/2011 Lee
2013/0265694 A1  10/2013 Texter

OTHER PUBLICATIONS

James P. Riser—Ball Gimmick from a Tom Stone Idea http://jamesriser.com/Magic/BallGimmick/FromTomStoneIdea.html.
Master Magnetics, Inc.—Commercial Website http://www.magnetsource.com/Solutions_Pages/rndbasecovers.html.
Dongyang Mag Magnetics Co, Ltd.—Commercial Website http://www.asia.ru/en/ProductionInfo/644761.html.

* cited by examiner

Fig.12

DECORATIVE AND MAGNETIC CLEANOUT COVER

CROSS-REFERENCE TO RELATED APPLICATIONS

This U.S. Non-Provisional Patent Application claims the benefit of U.S. Provisional Patent Application No. 62/082,024, filed on Nov. 19, 2014, titled "Decorative and Magnetic Cleanout Cover", by sole inventor Duane Heaton, the contents of which are expressly incorporated herein by this reference as though set forth in their entirety.

FIELD OF USE

The present disclosure relates generally to the field of plumbing and drain cleanout covers, and more specifically, to systems and devices for covering drain cleanouts with an attractive and easily removable cover.

BACKGROUND

A drain cleanout is an opening or drain leading into a plumbing system and provides a location to insert a snake or other implement for cleaning. The cleanout is usually easily accessible and is typically not part of a plumbing fixture, which may be damaged when using a drain snake. Most drain cleanouts are substantially flush with a wall and are typically plugged up with a threaded cap or plug. The cleanout and cap are generally unattractive and are frequently placed in visible locations. As a result, many have used drain cleanout covers to cover the drain cleanout and prevent accidental access to the cleanout. Drain cleanout also generally provide a more attractive appearance.

Standard drain cleanout covers are flat or domed, depending on whether the cleanout and cap outwardly extends beyond the wall. The standard drain cleanout cover is generally circular to conform to the shape of the hole of the cleanout, and typically has a lag or sheet metal screw for attaching the cleanout cover to plug. The attachment mechanism may be a screw that passes through the cleanout cover and into a rubber plug, thereby fastening the cleanout cover against the plug.

Unfortunately, standard cleanout covers are typically chrome or brass and are generally unattractive and are typically constructed of chrome or brass. Standard cleanout covers also generally show the head of the screw and are not easily removeable and replaceable.

Thus, there is a long felt need in the art for a new drain cover that is decorative and/or aesthetically pleasing and is easily removeable without having to unscrew an attachment screw.

SUMMARY

To minimize the limitations in the cited references, and to minimize other limitations that will become apparent upon reading and understanding the present specification, the present specification discloses a new and improved decorative and magnetic cleanout cover.

One embodiment may be a cleanout cover, comprising: a cover portion; and a magnet; wherein the magnet may be connected to the cover portion; wherein the magnet may be configured to magnetically engage with a cleanout engagement device; wherein the cleanout engagement device may be configured to physically engage with a drain cleanout; wherein, when the cleanout cover is magnetically coupled to the cleanout engagement device, the cover portion may substantially cover the drain cleanout; and wherein the cleanout cover may be removeable from the cleanout engagement device, such that the drain cleanout may be accessible when the cleanout cover is removed. The cover portion may be decorative. The cleanout cover may further comprise a magnet engagement portion; and wherein the magnet engagement portion may be configured to engage with and securely hold the magnet. The cleanout cover may further comprise a magnet engagement portion and an insert; wherein the insert may be configured to engage with and securely hold the magnet; and wherein the insert may be configured to connect with the magnet engagement portion. The insert may be removeable from the magnet engagement portion. The cleanout engagement device may be a self-tapping screw. The self-tapping screw may be adjustable with respect to the drain cleanout, such that, when the cleanout cover is magnetically coupled to the cleanout engagement device, the cover portion may be capable of being substantially flush with a surface surrounding the drain cleanout. A shape of the cover portion may be substantially domed. The cover portion may be constructed of a plastic. The cover portion may be substantially flat.

Another embodiment may be a cleanout cover, comprising: a cover portion; a magnet; a magnet engagement portion; and an insert; wherein the insert may be configured to engage with and securely hold the magnet; wherein the insert may be configured to connect with the magnet engagement portion; wherein the magnet may be configured to magnetically engage with a cleanout engagement device; wherein the cleanout engagement device may be configured to physically engage with a drain cleanout; wherein the cover portion may be decorative; wherein, when the cleanout cover is magnetically coupled to the cleanout engagement device, the cover portion may be configured to substantially obscure from view the drain cleanout; and wherein the cleanout cover may be removeable from the cleanout engagement device, such that the drain cleanout may be accessible when the cleanout cover is removed. The insert may be removeable from the magnet engagement portion. The cleanout engagement device may be a self-tapping screw. The self-tapping screw may be adjustable with respect to the drain cleanout, such that, when the cleanout cover is magnetically coupled to the cleanout engagement device, the cover portion may be substantially flush with a surface surrounding the drain cleanout. A shape of the cover portion may be substantially domed. The cover portion may be constructed of a plastic. The cover portion may be substantially flat.

It is an object to provide a decorative and attractive cleanout cover.

It is an object to provide a cleanout cover that is held in place by a fastener and/or magnetism.

It is an object to provide a cleanout cover that is simple to install and easy to use.

It is an object to overcome the limitations of the prior art.

Other features and advantages will become apparent to those skilled in the art from the following detailed description and its accompanying drawings.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF ILLUSTRATIVE EMBODIMENTS

In the following detailed description of various embodiments, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 1-10% from the indicated number or range of numbers.

Figure 1:
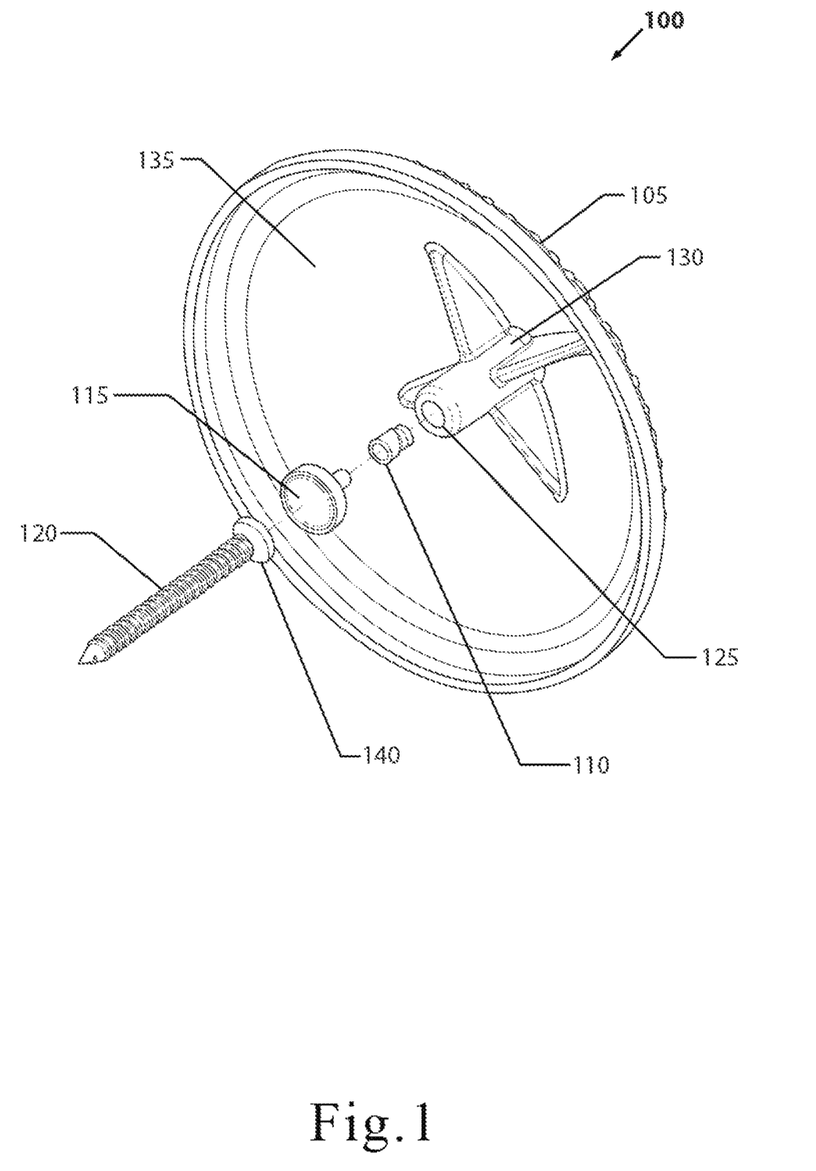
FIG. 1 is an illustration of a perspective exploded view of one embodiment of the decorative magnetic cleanout cover.

FIG. 1 is an illustration of an exploded perspective view of one embodiment of the decorative magnetic cleanout cover. As shown in FIG. 1, one embodiment of the decorative magnetic cleanout cover 100 may comprise: a cover portion 105, an insert 110, a magnet 115, and a cleanout engagement device 120. The insert 110 may be configured or adapted to interconnect the magnet 115 with the opening 125 of magnet engagement portion 130, which as shown may protrude from a central axis of the rearside 135 (i.e., the underside or bottom face) of the cover portion 105. In this manner, the insert 110 may be substantially connected to or housed within the magnet engagement portion 130. The magnet 115 may preferably be attracted to an end 140 of the cleanout engagement device 120, such that the cover 100 may be held firmly in place, but may be removable. The cleanout engagement device 120, as shown is preferably a self-tapping flat head screw that may be interconnected with a plastic/rubber drain plug and may be adjusted to a depth that allows the end 140 to attract and physically touch the magnet 115. In this manner, the entire cover 100 may be held in a removable and replaceable manner over a cleanout drain into which the cleanout engagement device 120 is connected. The magnet 115 is preferably a very strong magnet that holds the cover 100 firmly and securely in place and prevents the cover 100 from being inadvertently removed. The magnet 115, however, is also preferably not so strong that the cover 100 may not be removed purposefully. Once in place, the user may remove the cover 100 by firmly pulling or twisting the cover 100 away from the drain such that the magnet 115 and the cleanout engagement device 120 are separated.

In other embodiments, the cleanout engagement device 120 may be a fastener that engages a cleanout, drain, cap, or plug, including, but not limited to, a screw, self-tapping screw, nail, pin, bolt, batten, fastener, clip, clamp, flange, latch, dowel, rivet, or anchor. Preferably, the end 140 of the cleanout engagement device 120 is attracted to magnets (or may even be a magnet itself), the rest of the cleanout engagement device 120 may be constructed from any other material. Preferably, the other end of the cleanout engagement device 120 may fasten, connect with, or otherwise engage with a drain cleanout, cleanout plug, or clean out cap. In alternate embodiments, the magnet 115 may be a disc of metal that is attracted to magnets and the end 140 may be a magnet.

In other embodiments the cleanout engagement device 120 and magnet 115 may be replaced with a two parts that attach via friction or a fillable adhesive. The cover 105 may be substantially domed, as shown in FIG. 1.

Figure 2:
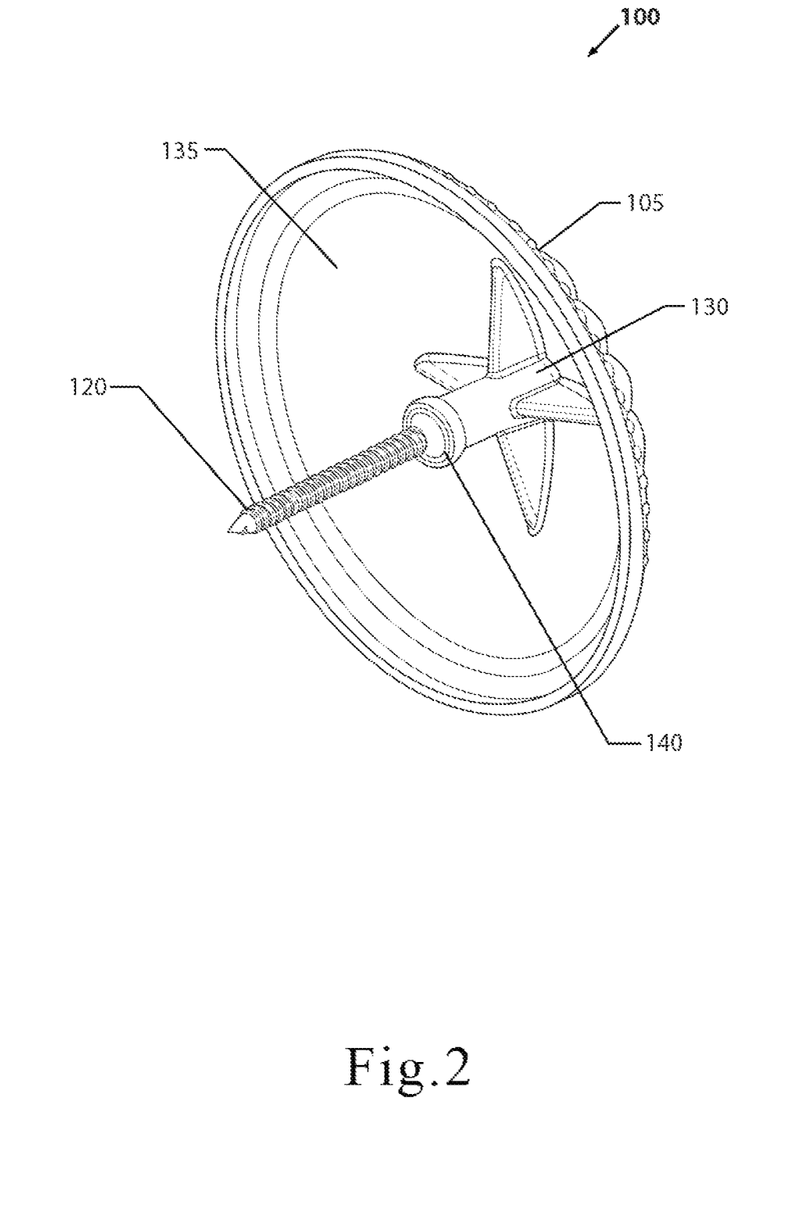
FIG. 2 is an illustration of a perspective assembled view of one embodiment of the decorative magnetic cleanout cover.

FIG. 2 is an illustration of a perspective assembled view of one embodiment of the decorative magnetic cleanout cover. FIG. 2 shows that the cover 100 may be assembled by interconnecting the magnet 115 to the magnet engagement portion 130, which protrudes from the central axis of the rearside 135 of the cover portion 105 via the insert 110. FIG.

2 also shows how the magnet 115 connects and holds via magnetic attraction the end 140 of cleanout engagement device 120.

Figure 3:
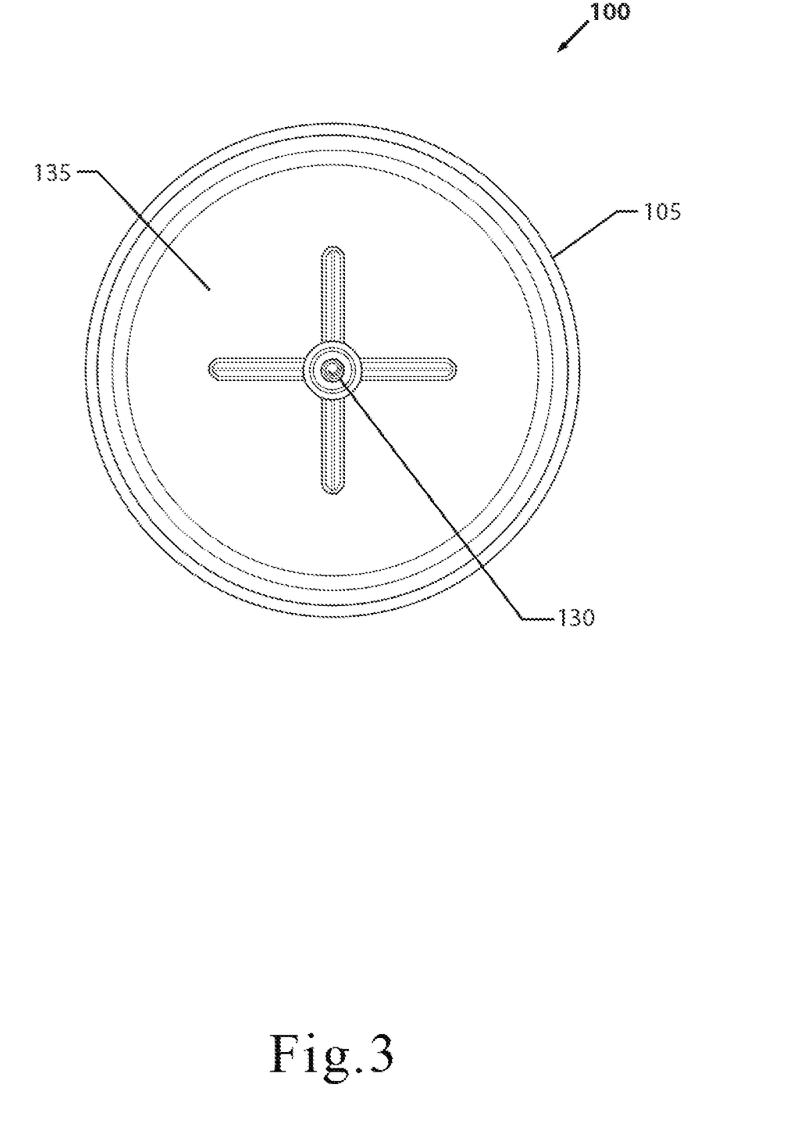
FIG. 3 is an illustration of a bottom view of one embodiment of the decorative magnetic cleanout cover.

FIG. 3 is an illustration of a bottom view of one embodiment of the decorative magnetic cleanout cover. As shown in FIG. 3, one embodiment of the magnet engagement portion 130 may be a female-threaded connector that may protrude from the central axis of the rearside 135 (or underside or bottom) of the cover portion 105. The insert 110, which may be a threaded device that is configured to interconnect the magnet 115 with magnet engagement portion 130, may be threadedly or frictionally engaged with the magnet 115 and/or the magnet engagement portion 130. Alternatively, the magnet may directly engage with magnet engagement portion 130. Generally, these portions of the cover 100 may be permanently or removeably interconnected via an adhesive, friction, threads, welding, solder, and the like. The cover portions 105 may be preferably substantially circular, as shown in FIG. 3. The cover portion 105 may be constructed from any type of material, including, but not limited to, plastic, metal, brass, wood, composite, and the like.

Figure 4:
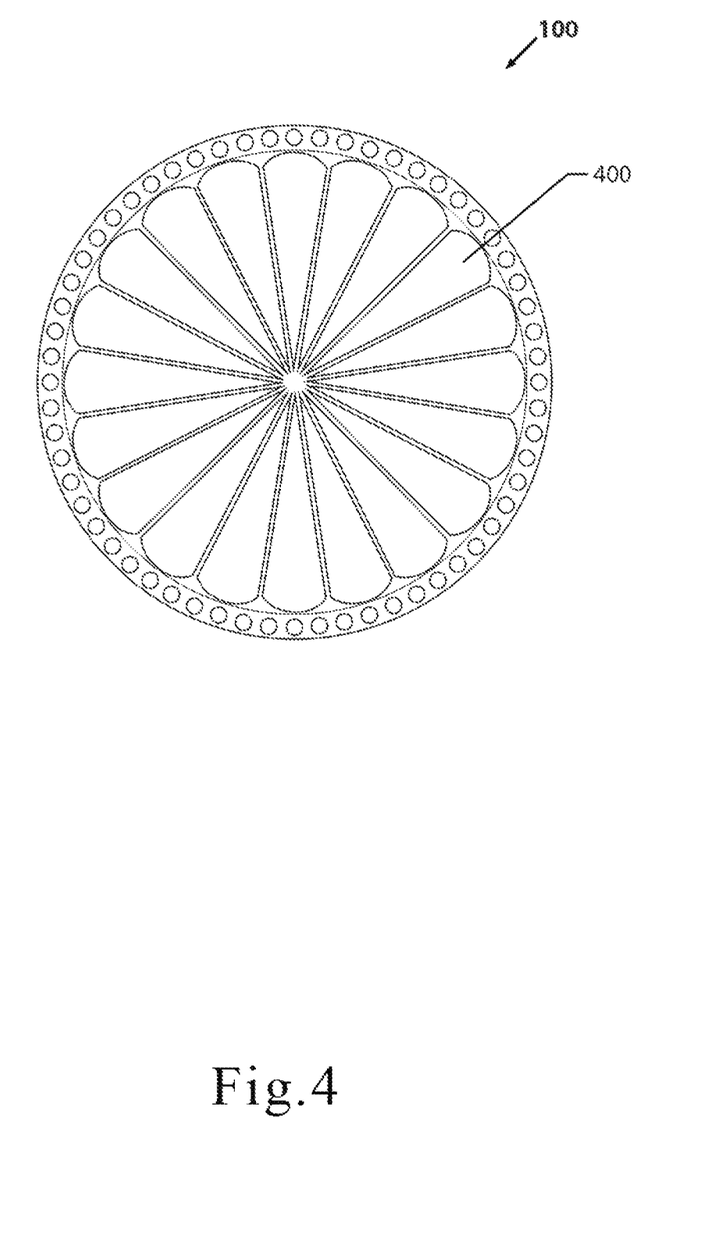
FIG. 4 is an illustration of a top view of one embodiment of the decorative magnetic cleanout cover.

FIG. 4 is an illustration of a top view of one embodiment of the decorative magnetic cleanout cover. FIG. 4 shows that the top portion 400 of the cover 100, which is the portion visible when the device is installed, is preferably decorative and attractive. FIG. 4 shows that the cover 100 preferably does not have a visible screw-head and may be shiny, beaded, painted, scalloped, plated, and/or otherwise made attractive and/or aesthetically pleasing. In one embodiment, the top portion 400 of the cover comprises at least one decorative pattern, as shown in FIG. 4.

Figure 5:
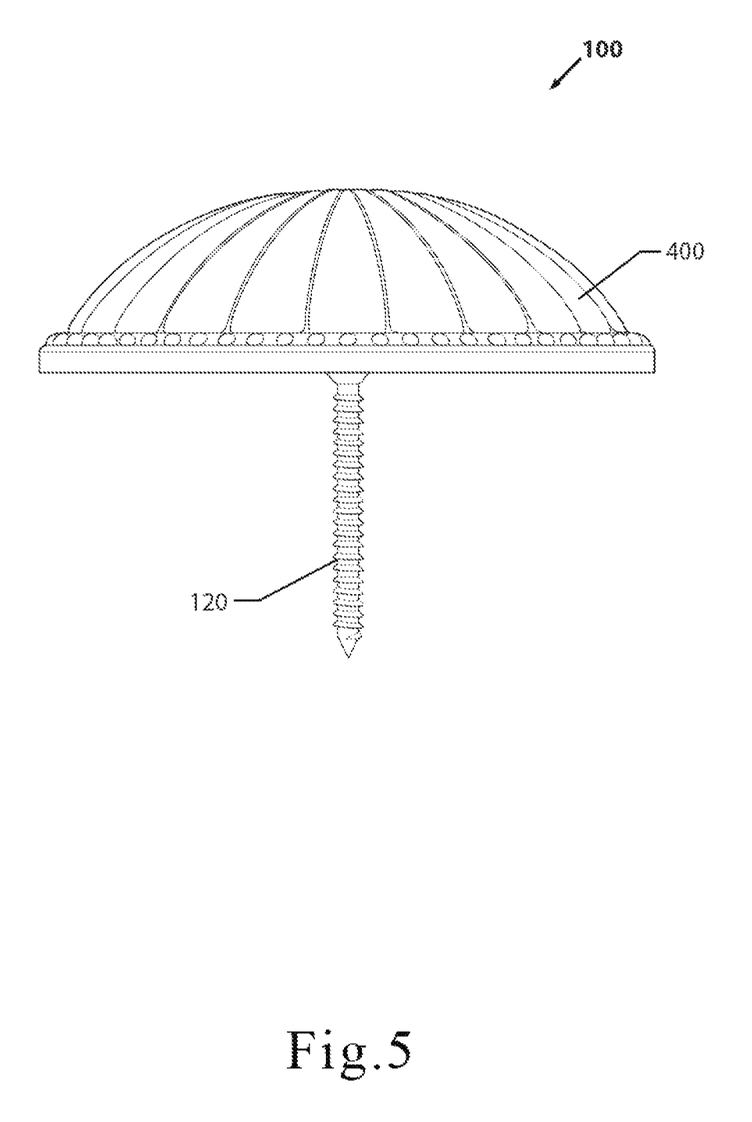
FIG. 5 is an illustration of a side view of one embodiment of the decorative magnetic cleanout cover.

FIG. 5 is an illustration of a side view of one embodiment of the decorative magnetic cleanout cover. As shown in FIG. 4, one embodiment of the decorative magnetic cleanout cover 100 may comprise a top portion 400 that may be scalloped and/or beaded or otherwise attractively decorated and aesthetically pleasing. A magnet that is part of cleanout cover 100 may be attached to the end (which may be a flat head) of the cleanout engagement device (which is shown as a self-tapping screw) 120. This may allow the cover 100 to be held in place and to prevent the cover 100 from being inadvertently removed from a drain.

Figure 6:
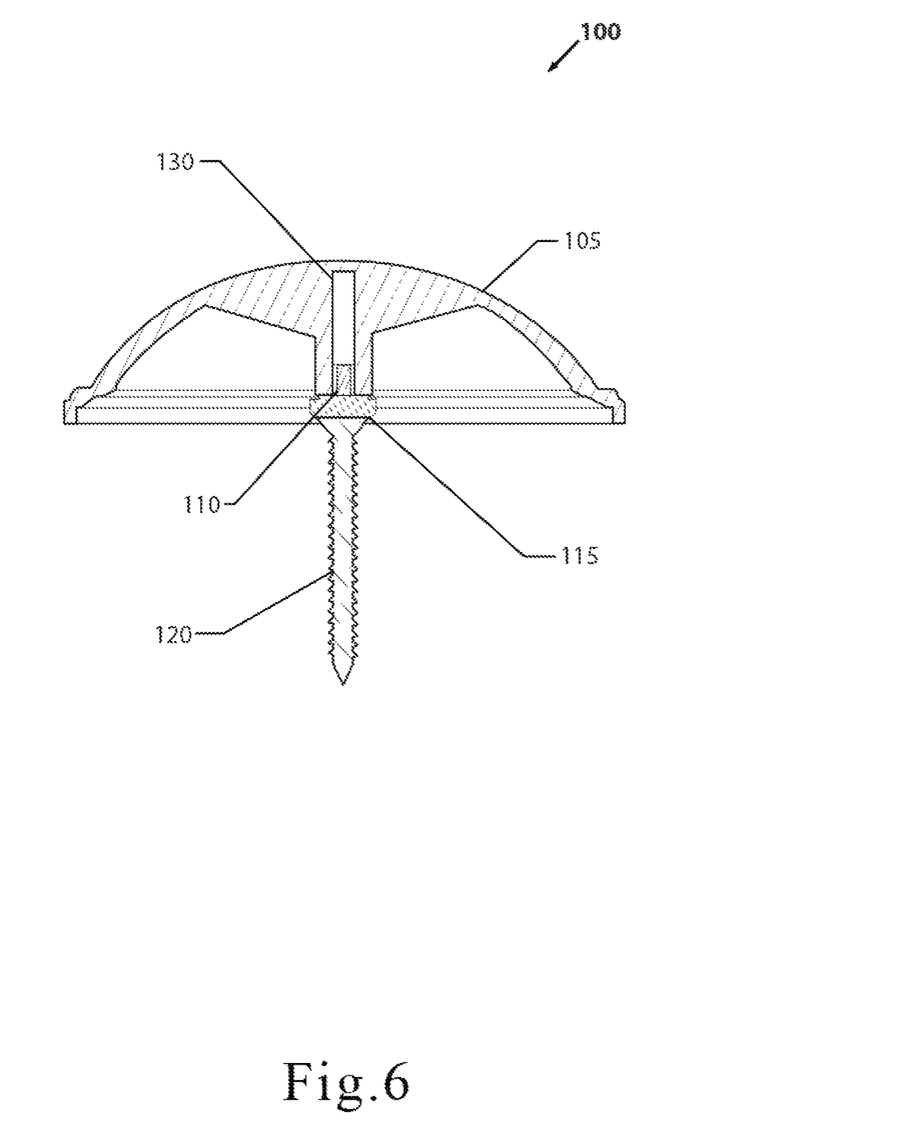
FIG. 6 is an illustration of a cross-section view of one embodiment of the decorative magnetic cleanout cover.

FIG. 6 is an illustration of a cross-section side view of one embodiment of the decorative magnetic cleanout cover. As shown in FIG. 6, one embodiment of the decorative magnetic cleanout cover 100 may comprise: a cover portion 105, an insert 110, a magnet 115, and a cleanout engagement device 120. The insert 110 may be configured to interconnect the magnet 115 with the opening 125 of magnet engagement portion 130, which as shown may protrude from a central axis of the rearside 135 (i.e., the underside or bottom face) of the cover portion 105. The position of the cleanout engagement device 120, which is shown as a self-taping screw, may be adjustable such that the cover portion 105 may be flushed against the wall or floor.

Figure 7:
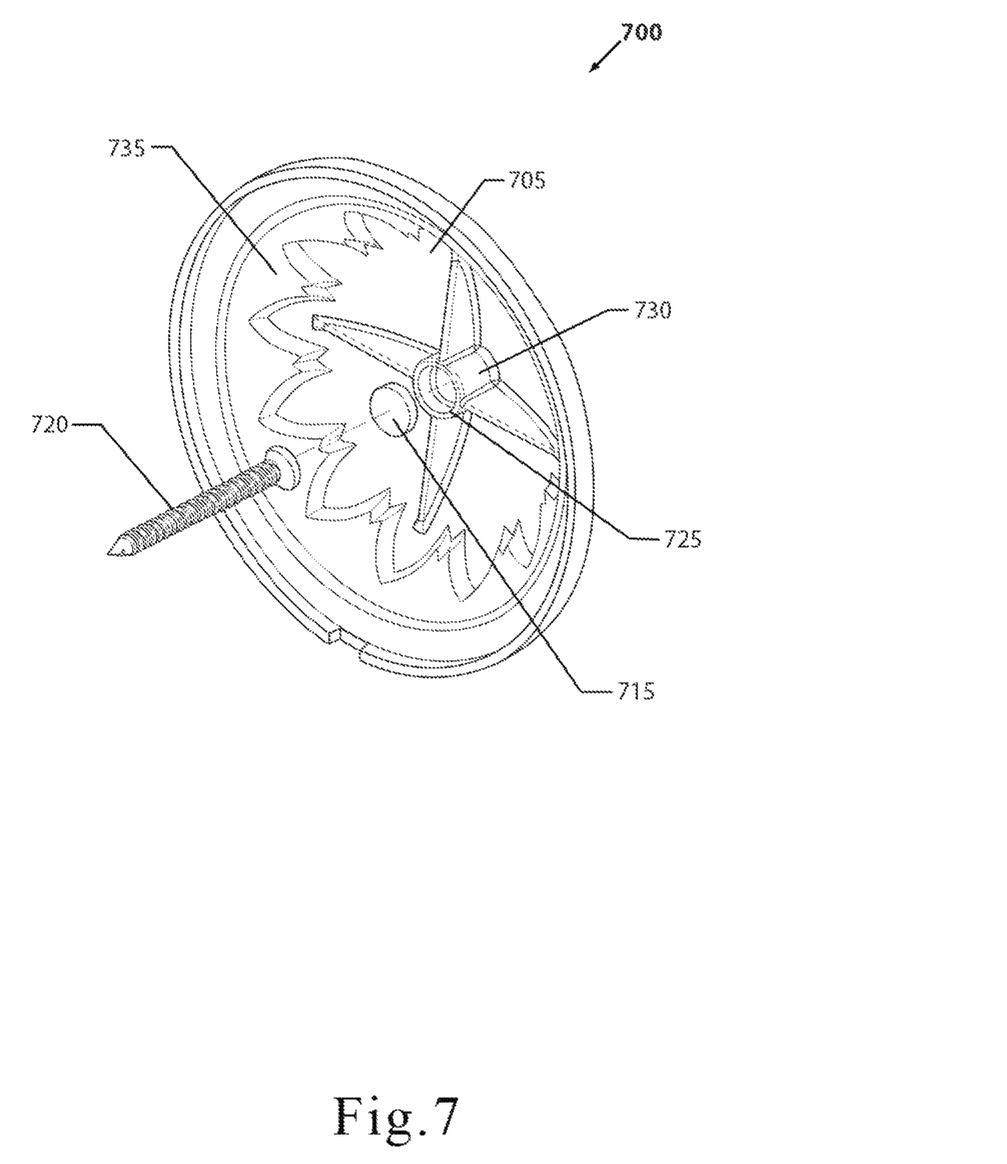
FIG. 7 is an illustration of a perspective exploded view of another embodiment of the decorative magnetic cleanout cover.

FIG. 7 is an illustration of a perspective exploded view of another embodiment of the decorative magnetic cleanout cover. As shown in FIG. 7, another embodiment of the decorative magnetic cleanout cover 700 may comprise: a cover portion 705, a magnet 715, and a cleanout engagement device 720. The magnet 715 may preferably be configured to engage with opening 725 of magnet engagement portion 730, which, as shown, may protrude from a central axis of the rearside (i.e. the underside or bottom face) 735 of the cover portion 705. Preferably, magnet 715 is held firmly and permanently in place, such that the magnet 715 stays in opening 725 when the magnet is pulled away from cleanout engagement device 720. The magnet may be held in place by an adhesive, friction, threading, solder, welding, ultrasonic welding, or an attachment device/connector.

Figure 8:
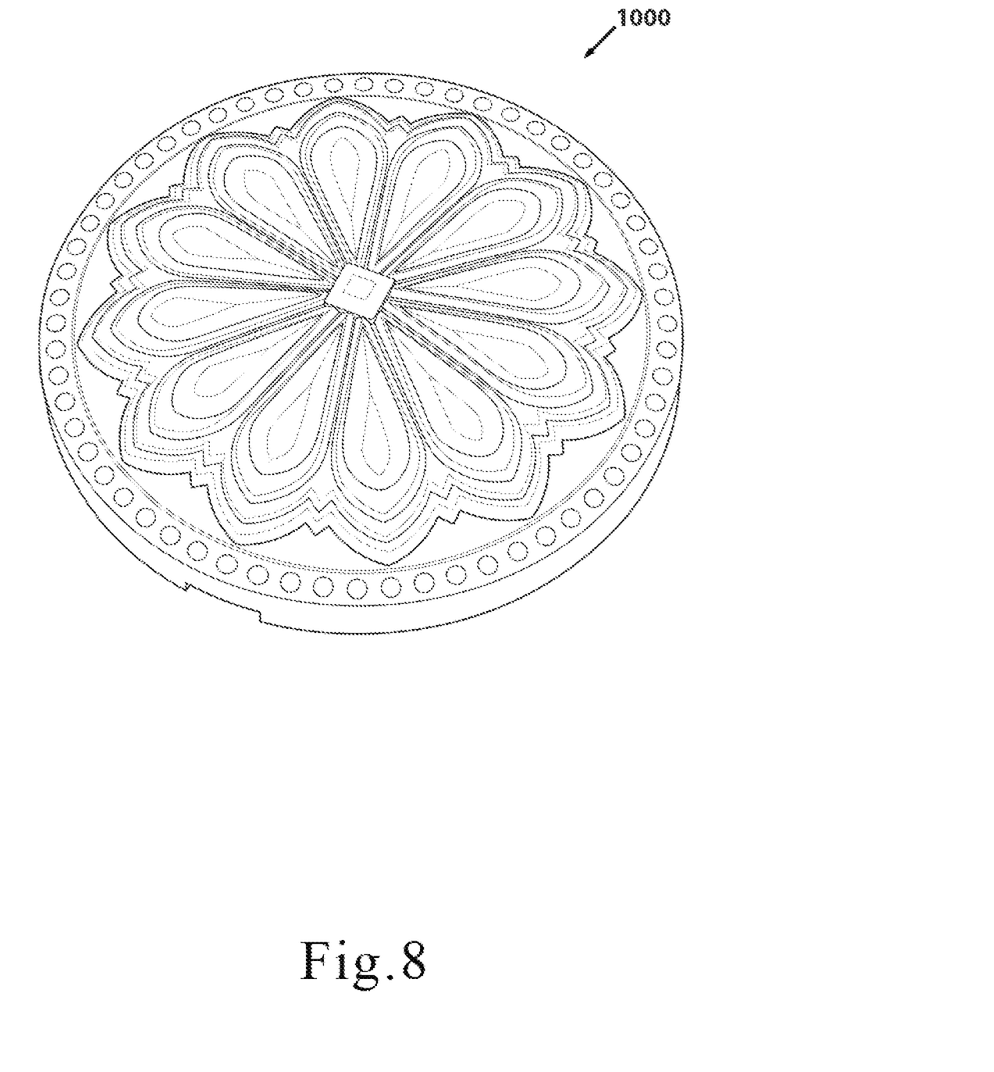
FIG. 8 is an illustration of a top perspective view of another embodiment of the decorative magnetic cleanout cover.

FIG. 8 is an illustration of a top perspective view of another embodiment of the decorative magnetic cleanout cover. FIG. 8 shows that the decorative cover 1000 may have an attractive design and may be substantially flat and not domed.

Figure 9:
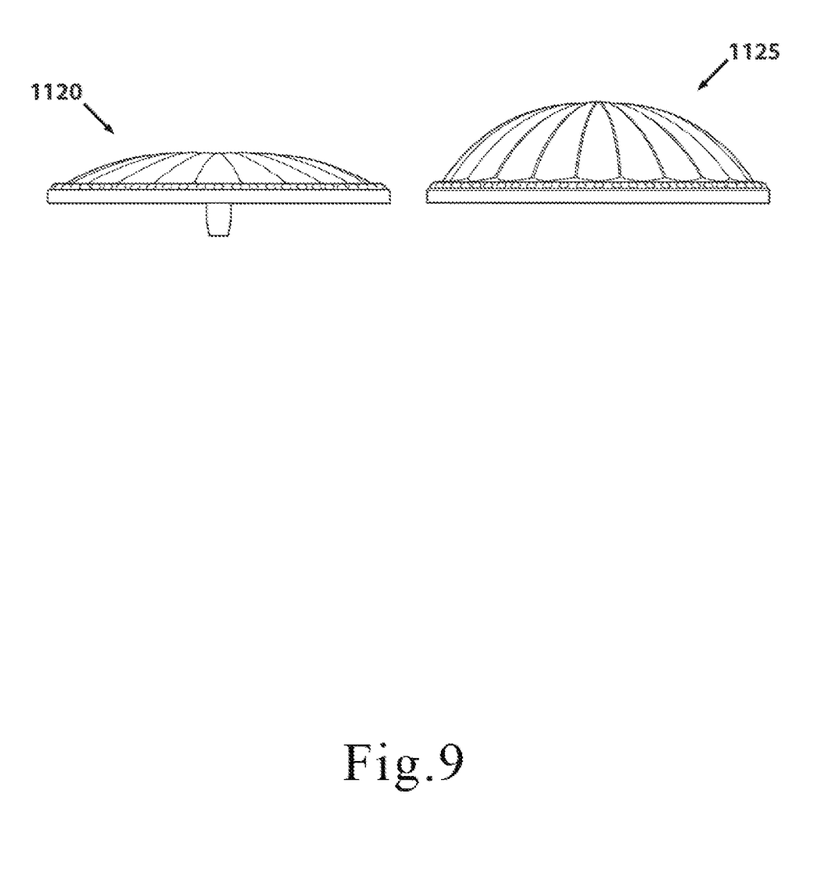
FIG. 9 is an illustration of a side view of two embodiments of the decorative magnetic cleanout cover.

FIG. 9 is an illustration of a side view of two embodiments of the decorative magnetic cleanout cover. FIG. 9 shows that the decorative cover may be substantially flat 1120 or domed 1125.

Figure 10:
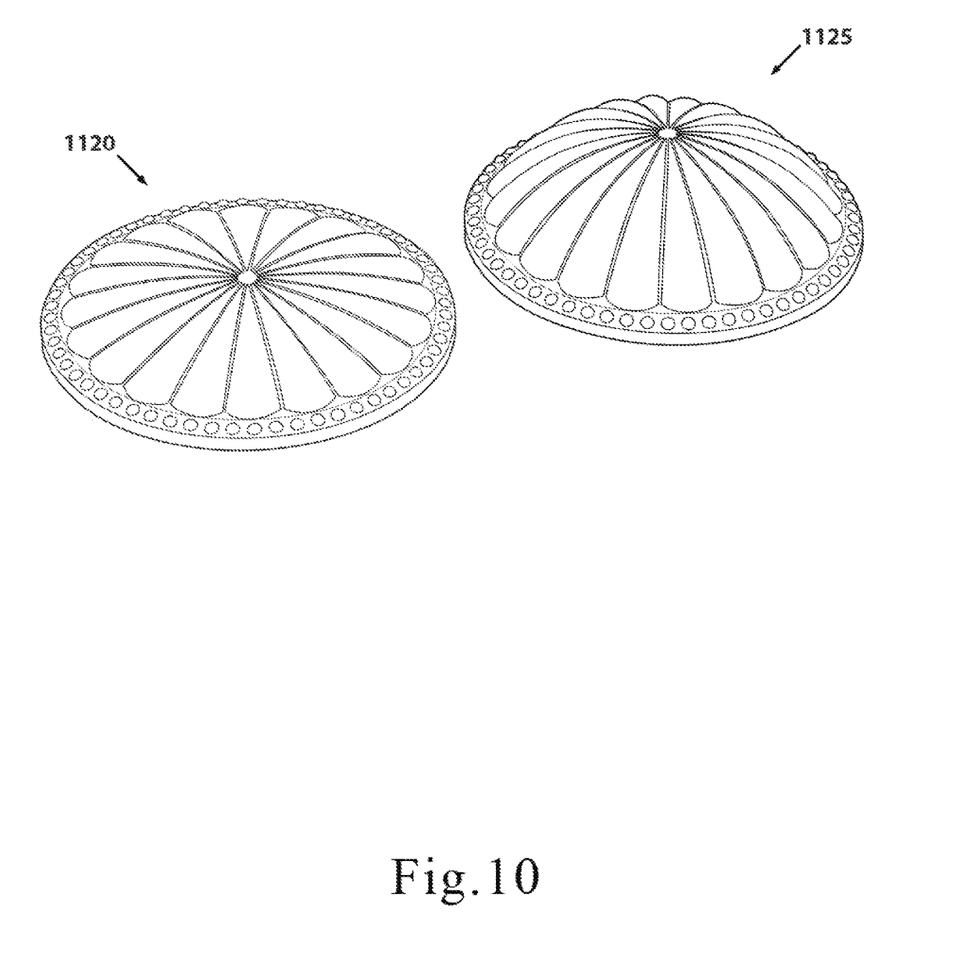
FIG. 10 is an illustration of a top perspective view of another embodiment of the decorative magnetic cleanout cover.

FIG. 10 is an illustration of a top perspective view of another embodiment of the decorative magnetic cleanout cover. FIG. 10 shows that the decorative cover may be substantially flat 1120 or domed 1125.

Figure 11:
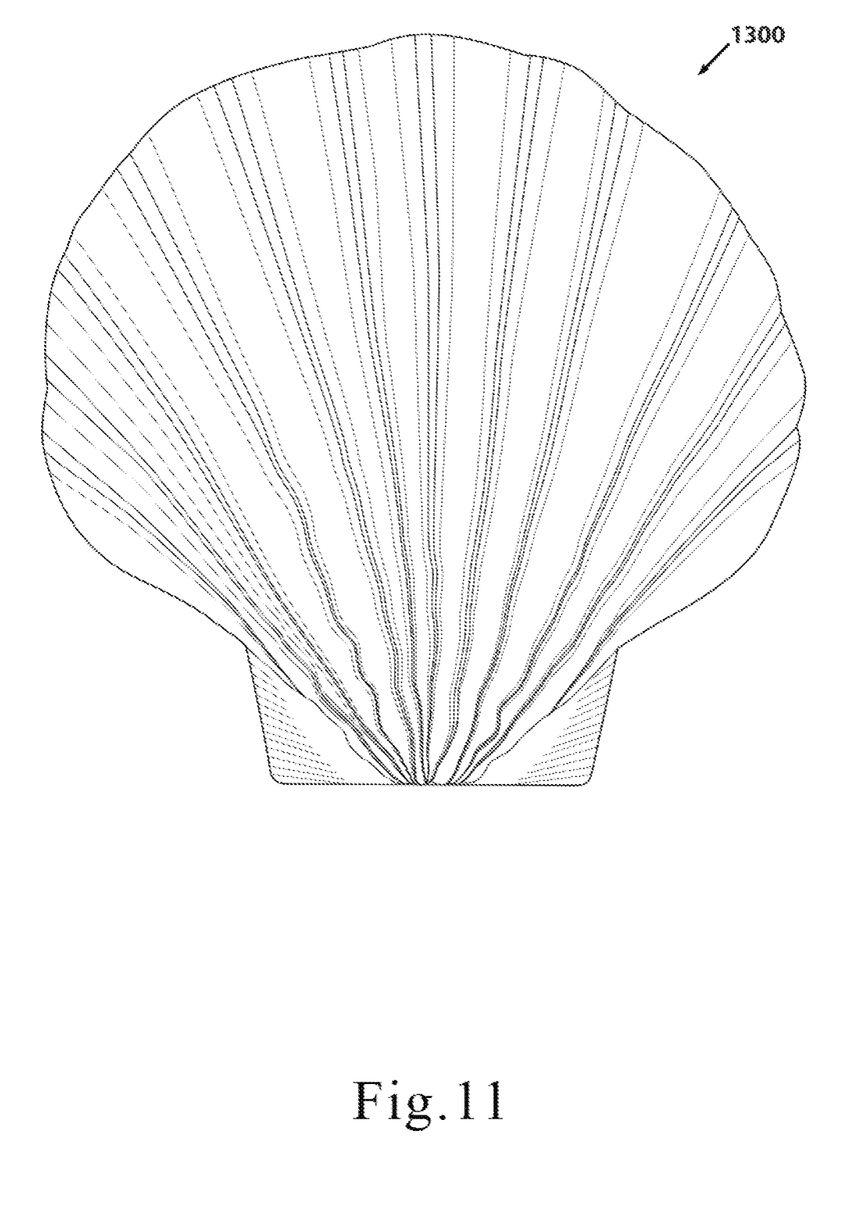
FIG. 11 is an illustration of a top view of another embodiment of the decorative magnetic cleanout cover.

FIG. 11 is an illustration of a top perspective view of another embodiment of the decorative magnetic cleanout cover. FIG. 11 shows that the decorative cover 1300 may be shaped as a sea shell.

Figure 12:
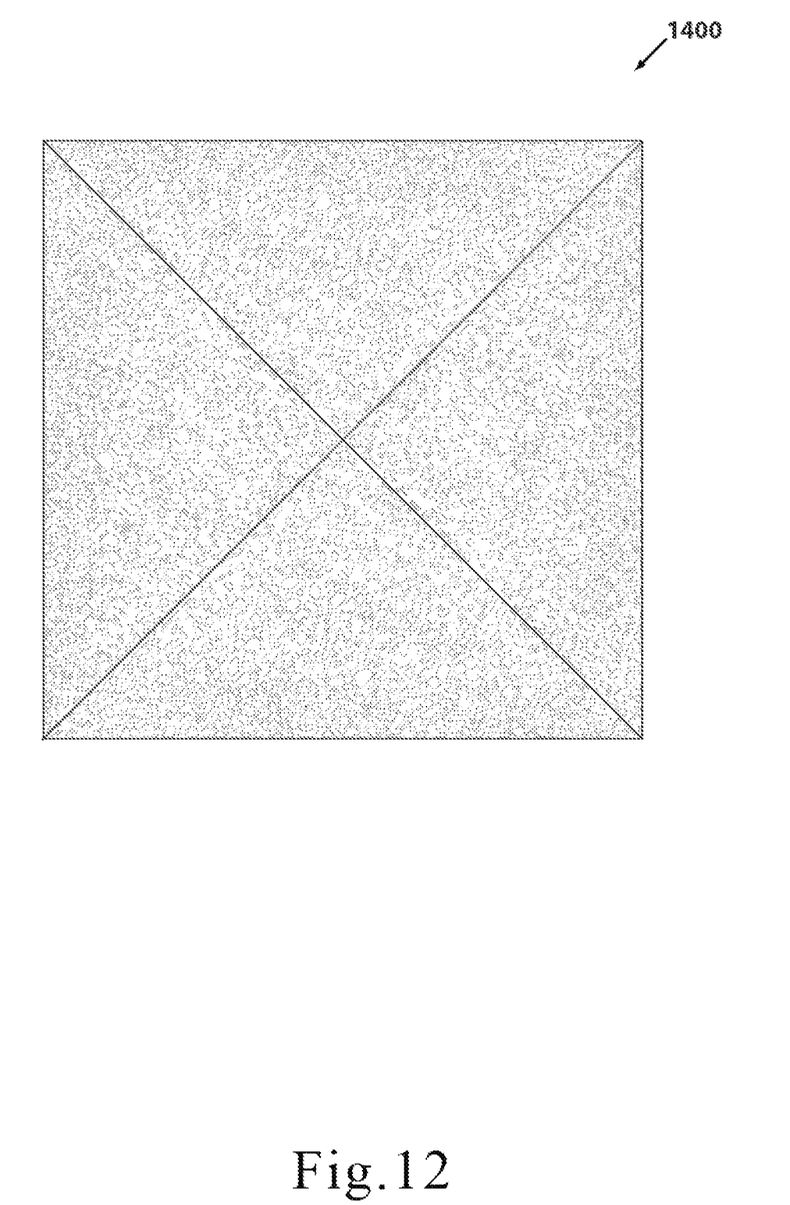
FIG. 12 is an illustration of a top view of another embodiment of the decorative magnetic cleanout cover.

FIG. 12 is an illustration of a top view of another embodiment of the decorative magnetic cleanout cover. FIG. 12 shows that the decorative cover 1400 may be shaped as a square and a pyramid.

The cover portion of the decorative cover may be painted any color and have various textures.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. The disclosed embodiments capable of modifications in various obvious aspects, all without departing from the spirit and scope of the protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope. It is intended that the scope or protection not be limited by this detailed description, but by the claims and the equivalents to the claims that are appended hereto.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A cleanout cover, comprising:
   a cover portion;
   a magnet;
   a magnet engagement portion; and
   an insert;
   wherein said insert is configured to engage with and securely hold said magnet;
   wherein said insert is configured to connect with said magnet engagement portion wherein said magnet is configured to magnetically engage with a cleanout engagement device;
   wherein said cleanout engagement device is configured to physically engage with a drain cleanout;
   wherein said cover portion is decorative;
   wherein, when said cleanout cover is magnetically coupled to said cleanout engagement device, said cover portion is configured to substantially obscure from view said drain cleanout; and
   wherein said cleanout cover is removeable from said cleanout engagement device, such that said drain cleanout is accessible when said cleanout cover is removed.

2. The cleanout cover of claim 1, wherein said insert is removeable from said magnet engagement portion.

3. The cleanout cover of claim 1, wherein said cleanout engagement device is a self-tapping screw.

4. The cleanout cover of claim 3, wherein said self-tapping screw is adjustable with respect to said drain cleanout, such that, when said cleanout cover is magnetically coupled to said cleanout engagement device, said cover portion is substantially flush with a surface surrounding said drain cleanout.

5. The cleanout cover of claim 1, wherein a shape of said cover portion is substantially domed.

6. The cleanout cover of claim 1, wherein said cover portion is constructed of a plastic.

7. The cleanout cover of claim 1, wherein said cover portion is substantially flat.

* * * * *